Sept. 14, 1965 R. L. FORSTER ETAL 3,206,133

TAPE CONTROL SYSTEM

Original Filed July 29, 1960 2 Sheets-Sheet 1

INVENTOR.
ROBERT L. FORSTER
WILLIAM D. MIXON
ATTORNEY.

Lewis P. Elbinger

TAPE CONTROL SYSTEM
Original Filed July 29, 1960
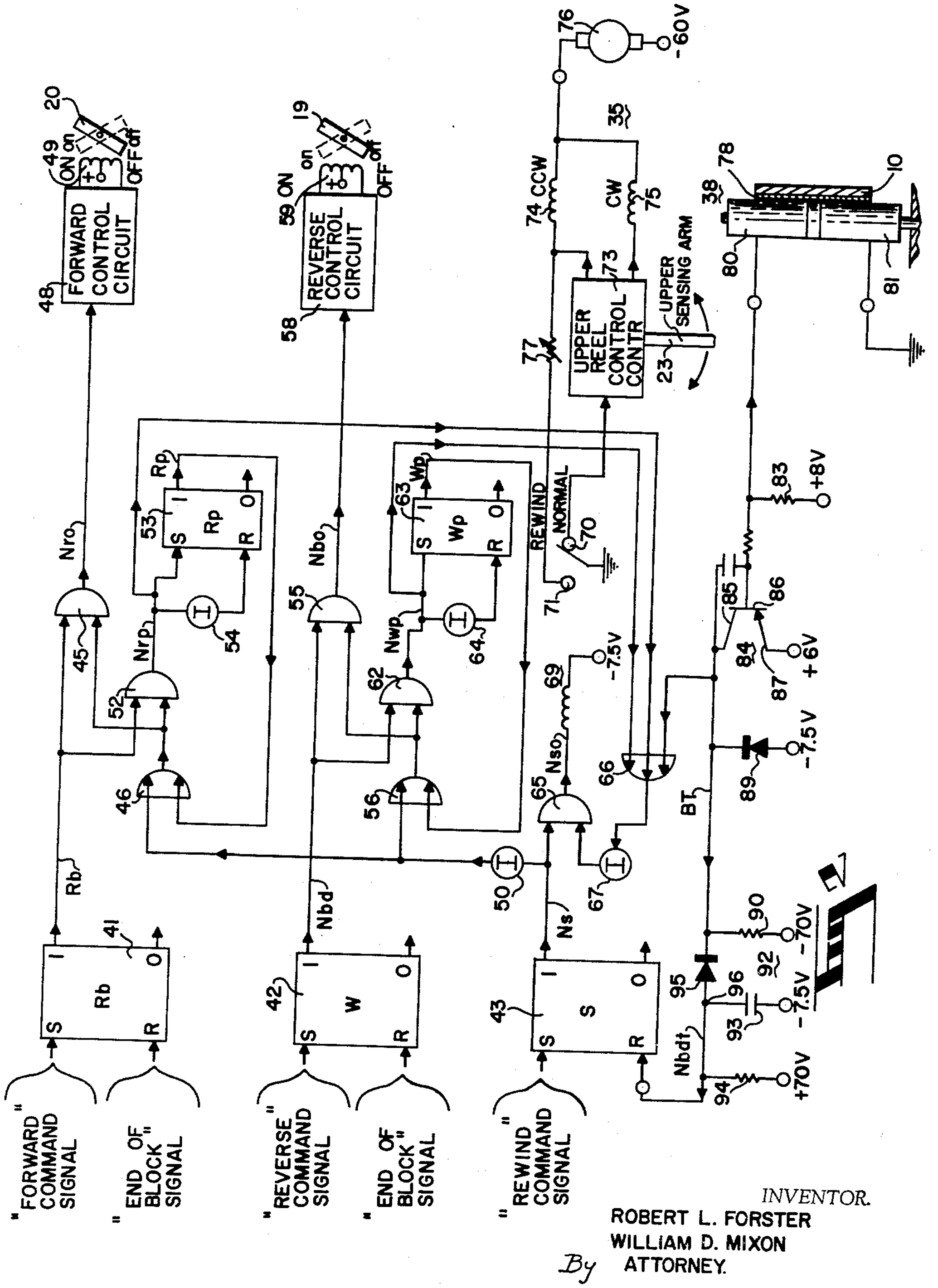
INVENTOR.
ROBERT L. FORSTER
WILLIAM D. MIXON
By ATTORNEY.

3,206,133
TAPE CONTROL SYSTEM

Robert L. Forster, 268 Kellogg Way, Santa Clara, Calif., and William D. Mixon, 8420 N. 16th Ave., Phoenix, Ariz.

Continuation of application Ser. No. 46,167, July 29, 1960. This application Sept. 27, 1963, Ser. No. 312,017
9 Claims. (Cl. 242—55.12)

Figure 1:
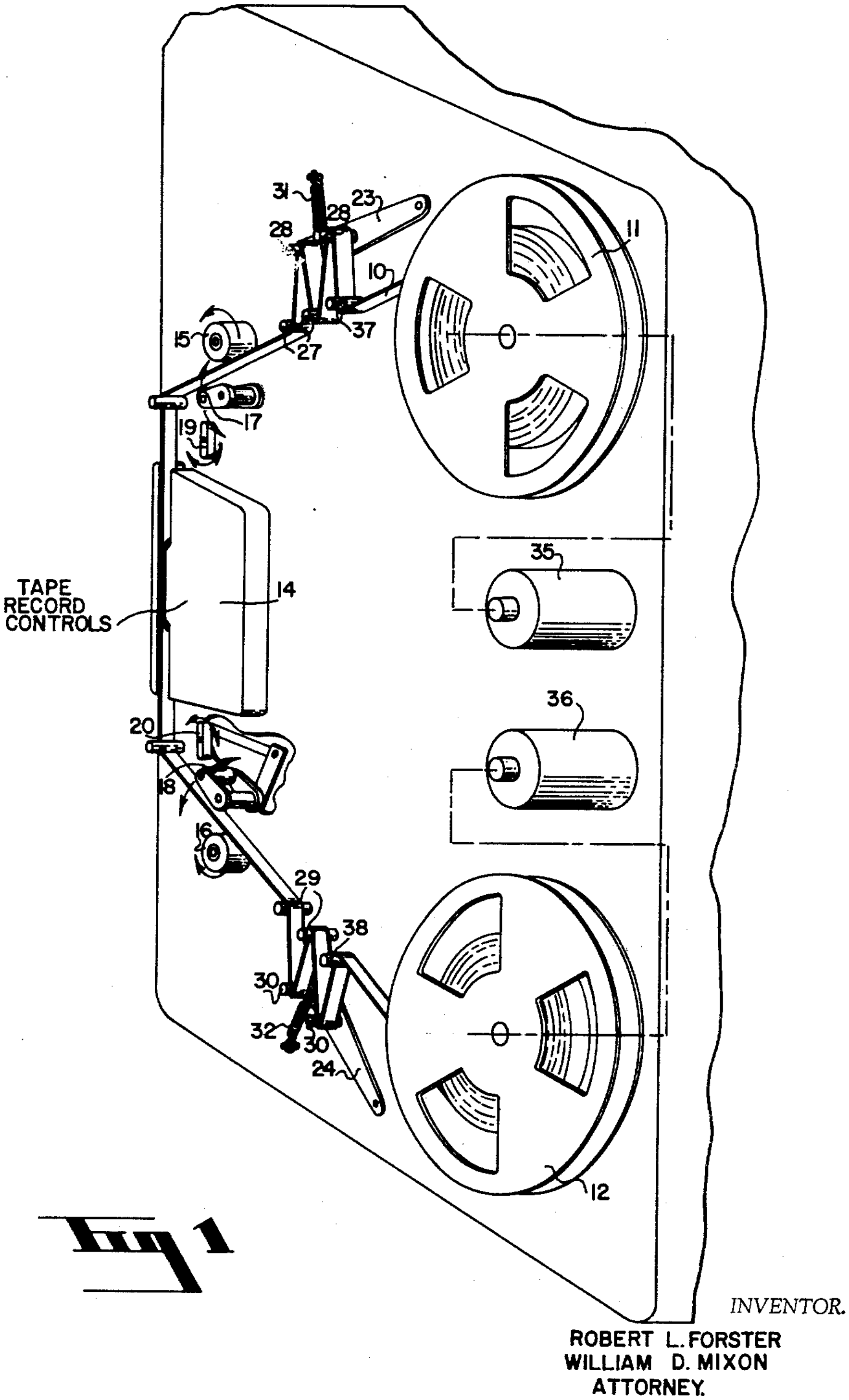

This application is a continuation of U.S. patent application Serial No. 46,167, filed July 29, 1960, now abandoned.

This invention relates to a system for controlling the motion of an elongated data storage medium, and more particularly, to apparatus for preventing a magnetic tape from breaking in a system wherein the tape handler is required to execute successive operations requiring rapid reversals in direction of the tape motion.

In U.S. Patent 3,077,984, granted to R. R. Johnson, and assigned to the assignee of the instant invention, there is described a high speed data processing system wherein data for processing and processed data is recorded on magnetic tape. Magnetic tapes in the system are employed in tape handlers, wherein data is read from or written on a tape by moving the tape in its longitudinal direction past respective read and write heads. The magnetic tape handlers perform their operations in response to commands from the central processor of the data processing system and, in a high speed system, must be capable of moving the tape at high speed in both forward and reverse directions and must be capable of changing the direction of motion of the tape very rapidly. Accordingly, in a high speed system, a tape handler, in response to commands to read or write data on the tape, moves the tape at high speeds in a forward direction past respective read or write heads. In response to certain other commands, such as erase commands, the tape handler moves the tape at equally fast speeds in a reverse direction past erasing heads. Finally, in response to commands to rewind the tape to its beginning, since no data reading, writing or alteration takes place, the tape is rewound onto a "rewind" reel, by moving the tape in the reverse direction at even higher speeds than are employed during reading, writing and erasing operations. To employ most effectively a tape handler of a data processing system, the tape handler should not remain idle any longer than necessary. For example, upon completion of a rewind operation, the tape should be immediately started forward in a read or write operation. However, the central processor of the data processing system operates asychronously with respect to the tape handlers, executing various instructions in sequence, such instructions including among them commands for the tape handlers, so that upon completion of the aforementioned rewind operation the central processor may not be ready to execute an instruction to command the next tape handler operation. Therefore, in order that a tape handler, upon completion of execution of a particular operation, need not remain idle until the central processor is ready to execute an instruction commanding the next tape handler operation, the tape handler stores signals representing commands to be executed when the current operation is completed. Thus, in the above example, while the tape handler is executing a rewind operation, it may store a signal representing a read command, such read command to become effective immediately upon completion of the current rewind operation.

In the system above-described, wherein a read command signal may be stored, awaiting the completion of a rewind operation to become effective, the continued presence of the rewind command signal inhibits the effect of the stored read command signal until the tape reaches a rewound condition. A sensor proximate to the tape detects a metal leader affixed to the beginning end of the tape, as the tape rewinds, and signals the tape handler that the rewind operation is complete so that the next operation may be initiated. However, at this moment, the tape is moving at the very high rate of speed of the rewind operation and most of the tape is on the rewind reel, so that at the instant the beginning of the tape is sensed the rewind reel and tape thereon has great inertia in the reverse direction. To immediately execute the stored read command by pulling the tape forward off the rewind reel at the relatively high rate of speed required in the read operation would result in snapping or breaking the tape. Accordingly, it is desirable to provide for controlling the tape handler described to rapidly execute successive commands requiring opposite directions of motion of the magnetic tape without breaking the tape.

Therefore, it is the principal object of this invention to provide apparatus for rapidly reversing the direction of motion of an elongated data storage medium.

Another object of this invention is to provide apparatus for rapidly reversing the direction of motion of magnetic tape without breaking the tape.

Another object of this invention is to provide apparatus for controlling a tape handler to rapidly respond to successive commands requiring motion of the tape in opposite directions at high speeds.

Another object of this invention is to provide apparatus for controlling a tape handler to initiate a forward operation as soon as possible after completion of a rewind operation without breaking the tape.

The foregoing objects are achieved in the instant invention by providing that the stored rewind command signal remains effective to inhibit the initiation of a read, or other operation requiring forward tape motion, while the reverse motion of the tape is being halted. A "rewind" flip-flop is employed to store the rewind command signal. The output signal of the rewind flip-flop is coupled to a first gate, which is enabled during the rewind operation, the output signal of this first gate controlling the tape rewind driving means. A read command signal is stored in a "read" flip-flop. The output signal of the read flip-flop is coupled to a second gate, an output signal from this second gate actuating the tape forward driving means. The output signal of the rewind flip-flop inhibits an output signal from the second gate so long as the rewind flip-flop remains in its set state. When the beginning of the tape is sensed during the rewinding operation, the resulting sensor output signal immediately inhibits signal transmission of the first gate and brakes the rewind driving means to decelerate the tape to a stop. At the same time the sensor output signal is applied as an input signal to a delay element, which does not deliver an output signal until the tape is halted. The subsequent output signal of the delay element then resets the rewind flip-flop, thereby enabling the second gate to start the tape forward driving means, if the read flip-flop is in its set state. Accordingly, although the beginning of the tape, when sensed, halts the rewind operation, the rewind flip-flop of the invention continues to inhibit the issuance of a signal which initiates a forward motion of the tape until the tape is safely stopped. Thus, the invention prevents the tape from breaking, while controlling the tape handler to rapidly respond to successive commands requiring motion of the tape in opposite directions at high speeds.

The invention will be described with reference to the accompanying drawings wherein:

FIGURE 1 is a schematic diagram of a tape handler employed with the invention; and FIGURE 2 is a block diagram of the invention.

TAPE HANDLER

Only so much of the tape handler is shown in FIG. 1 as is necessary to understand the operation of the instant invention in controlling such tape handler.

An elongated data storage member, such as a length of magnetic tape 10, is stored on a pair of reels 11 and 12. When tape 10 is moved in the predetermined forward direction it is unwound from reel 11 and wound on reel 12. When tape 10 is moved in the predetermined reverse direction it is unwound from reel 12 and wound on reel 11. During the "rewind" operation tape 10 is also unwound from reel 12 and rewound onto reel 11.

Tape record controls 14 function to read, write, and erase data on tape 10 as the tape passes therethrough. Thus, in a reading or writing operation, the tape is moved in the forward direction through record controls 14 at high speed, as controls 14 read or write data on the tape. In an erasing operation, the tape is also moved at high speed, but in the reverse direction through record controls 14, as controls 14 erase data on the tape. In the rewind operation, tape 10 is moved at even higher speed in the reverse direction through record controls 14, but controls 14 are not activated to read or otherwise alter the data on the tape.

One of two capstans 15 or 16 is employed to drive tape 10 in the reverse or forward direction during a read, write or erase operation. Capstans 15 and 16 are continuously rotated at constant high speeds by a motor, not shown. Capstan 15 drives tape 10 in the reverse direction and capstan 16 drives the tape in the forward direction. Tape 10 is driven in the reverse direction when a pinch roller 17 is swiveled to press the tape against capstan 15. Tape 10 is driven in the forward direction when a pinch roller 18 is swiveled to press the tape against capstan 16. Pinch roller 17 is connected to and rotated by an actuator arm 19. Pinch roller 18 is connected to and rotated by an actuator arm 20. Actuator arms 19 and 20 are rotated by magnetic control winding means, shown schematically in FIG. 2. Thus, when tape 10 is to be driven in the forward direction, actuator arm 20 is caused to rotate clockwise, as shown in FIG. 1, urging pinch roller 18 and the tape against capstan 16. When tape 10 is to be driven in the reverse direction, actuator arm 19 is rotated counterclockwise urging pinch roller 17 and the tape against capstan 15.

During the above-described normal forward and reverse motions of tape 10, reels 11 and 12 function only to supply and receive the tape as respectively required and supplied by the driving capstans. Accordingly, the rate and direction of rotation of the reels is governed by the particular capstan driving the tape. In order that reels 11 and 12 rotate in the proper direction and at the requisite speeds to supply and receive the tape, a pair of rotatable sensing arms 23 and 24 are provided for sensing the magnetic tape adjacent the reels and, in response thereto, for controlling the direction and rate of rotation of respective reels 11 and 12. Upper sensing arm 23 senses the length of tape between reel 11 and capstan 15. Tape 10 is threaded through a set of idler rollers 27, which are mounted for rotation on the frame of the tape handler, and a set of idler rollers 28, which are mounted for rotation on sensing arm 23. Lower sensing arm 24 senses the length of tape between reel 12 and capstan 16. Tape 10 is threaded through a set of idler rollers 29, which are mounted for rotation on the tape handler frame, and a set of idler rollers 30, which are mounted for rotation on lower sensing arm 24. Each of a pair of springs 31 and 32 has one end thereof affixed to the free end of a respective one of sensing arms 23 and 24 and other end thereof affixed to the tape handler frame. The opposite end of each sensing arm pivots about a post affixed to the frame. A decreasing length of tape 10 between reel 11 and capstan 15 rotates arm 23 clockwise against the restraining motion of spring 31.

Similarly a decreasing length of tape 10 between reel 12 and capstan 16 rotates arm 24 counterclockwise against the restraining force of spring 32.

A drive motor 35 drives reel 11 in the correct direction and at the proper speed to tend to maintain a substantially constant length of tape 10 between reel 11 and capstan 15. Similarly, a drive motor 36 drives reel 12 to tend to maintain a substantially constant length of tape 10 between reel 12 and capstan 16. Controllable electric current is delivered to drive motors 35 and 36 in order to drive corresponding reels 11 and 12 in the requisite direction at the proper speed. This controllable electric current is supplied for each drive motor 35 and 36 by a respective control contactor, not shown in FIG. 1. Each control contactor is coupled to and responds to the position of respective arms 23 and 24, whereby the speed and direction of rotation of motors 11 and 12 are controlled to supply and receive tape as required when a capstan 15 or 16 is driven.

The tape handler operations so far described, relate to the normal high speed forward and reverse operations occurring when the tape handler is reading, writing or erasing on tape 10. During a rewind operation, when the tape is transferred from reel 12 to reel 11 at very high speeds, the operation of the tape handler differs. In the rewind operation neither of capstans 15 or 16 is employed to drive the tape; instead, drive power is supplied directly to motor 35. Accordingly, reel 11 is driven at high speed in a counterclockwise direction in order that the tape may be rewound as rapidly as possible, reel 11 pulling the tape off reel 12. During this operation, sensing arm 23 plays no part because its associated control contactor is de-energized.

Sensing means are employed to halt forward, reverse, and rewind operations when no more tape is available in the direction in which the tape is currently moving. A pair of roller sensors 37 and 38 are mounted for rotation on the frame of the tape handler and sense tape 10, which passes over each sensor. A metallized strip is affixed to each extremity of tape 10 and functions to energize a respective one of sensors 37 and 38. When most of tape 10 is wound on reel 12, sensor 37 detects the metallized strip on the tape extremity attached to reel 11 and delivers a signal denoting that the end of the tape has been reached. When most of tape 10 is wound on reel 11, sensor 38 detects the metallized strip on the tape extremity attached to reel 12 and delivers a signal denoting that the beginning of the tape has been reached.

When the tape handler is performing a rewind operation, reel 11 is being rotated at very high speeds by drive motor 35 at the time that sensor 38 first detects the metallized strip on tape 10. At this time the output signal of sensor 38 is employed to terminate the rewind operation. Since most of the tape is now wound on reel 11 and reel 11 is rotating very rapidly, at this moment reel 11 has a large amount of inertia. In accordance with the instant invention, reel 11 is now quickly brought to a halt and tape 10 is allowed to move forward for a reading or writing operation as soon as possible without breaking the tape, despite the great inertia of reel 11 and the tape wound thereon.

TAPE HANDLER CONTROLS

The diagram of FIG. 2 illustrates those portions of the electronic system employed for controlling the tape handler of FIG. 1 which embody the instant invention. It is to be understood that the complete tape handler control system is considerably more complex than that shown, the complete system controlling functions of the tape handler not necessary to the description herein. A bistable device, such as flip-flop 41, stores a signal representing a command for tape 10 to be moved forward, as in the read operation. A flip-flop 42 stores a signal representing a command for tape 10 to be moved in the reverse, as in the erase operation. A flip-flop 43 stores a signal representing a command for tape 10 to be rewound. Flip-flops 41, 42 and 43 will hereinafter be designated respectively as the R*b*, W, and S flip-flops in accordance with the nomenclature employed in the tape handler system.

The flip-flop is a bistable device, well known in the art, that is adapted to operate in either one of two stable states, and to transfer from the state in which it is operating to the other stable state upon application of a trigger signal thereto. In one state of operation the flip-flop represents a binary 1 (1-state) and in the other state a binary 0 (0-state). When the flip-flop is in the 1-state, a positive output signal representing a binary 1 is delivered on the 1-output lead thereof and when the flip-flop is in the 0-state a positive output signal representing a binary 1 is delivered on the 0-output lead thereof. The output leads on the flip-flops are the two leads issuing from the right-hand side of the flip-flop symbolic blocks. The 1-output lead is denoted by the numeral "1" adjacent thereto and the 0-output lead by the numeral "0" adjacent thereto. The flip-flop is adapted to receive two input signals. When a positive input signal is received on the input lead designated by the letter "S," the flip-flop is "set," and is placed in its 1-state. When a positive input signal is received on the input lead designated by the letter "R," the flip-flop is "reset," and placed in its 0-state. Accordingly, when a binary 1 signal is received on the S input lead, the flip-flop will be transferred to its set state, if it is not already in the set state. When a binary 1 signal is received on the R input lead, the flip-flop will be transferred to its reset state, if it is not already in the reset state.

The signal delivered on the 1-output lead of the R*b* flip-flop is designated as the R*b* signal. Thus the R*b* signal is a positive voltage representing a binary 1 when the R*b* flip-flop is in its set state and a negative voltage representing a binary 0 when the R*b* flip-flop is in its reset state. The signal delivered on the 1-output lead of the W flip-flop is designated as the N*bd* signal. The signal delivered on the 1-output lead of the S flip-flop is designated as the N*s* signal.

In the circuit of FIG. 2, when the S flip-flop is transferred to its set state by a "rewind" command signal from the central processor of the system, the S flip-flop initiates the rewind operation of the tape handler. When the R*b* flip-flop is transferred to its set state by a "foward" command signal from the central processor, the R*b* flip-flop initiates tape operation in which the tape is driven forward, provided that the S flip-flop is not at that time in its set state. If, however, the S flip-flop is in its set state it will prevent the start of the tape action directed by the R*b* flip-flop. When the W flip-flop is transferred to its set state by a "reverse" command signal from the central processor, the W flip-flop initiates a tape operation in which the tape is driven in reverse, provided that the S flip-flop is not at that time in its set state. If, however, the S flip-flop is in its set state, it will prevent the start of the tape action directed by the W flip-flop. Similarly, at the time the S flip-flop is set, the rewind operation will not commence if a forward or reverse motion of the tape is then occurring.

*Tape forward controls.*—The 1-output lead of the R*b* flip-flop is connected to one input terminal of a two-input AND-gate 45. The other input terminal of AND-gate 45 is coupled to receive the output signal of an OR-gate 46. An AND-gate is well-known in the art and provides a positive output signal, representing a binary 1, only when all of the input signals applied thereto are positive and represent binary 1's, otherwise the output signal is negative, representing a binary 0. An OR-gate is also well-known in the art and provides a positive output signal, representing a binary 1, when any one or more of the input signals applied thereto are positive and represent binary 1's.

The output signal of AND-gate 45 is designated as the N*ro* signal, or forward control signal, and is positive only when both input signals to AND-gate 45 are positive. This output signal of AND-gate 45 is coupled to the input terminal of a forward control circuit 48. The output terminals of forward control circuit 48 are connected to control windings 49, which function to control the position of actuator arm 20, shown in FIGS. 1 and 2.

When the N*ro* signal from AND-gate 45 swings from a negative to a positive polarity, control circuit 48 delivers an output signal on the upper output lead thereof, forcing actuator arm 20 to rotate into its "ON" position and urge pinch roller 18 against capstan 16, thereby driving tape 10 in the forward direction. When the N*ro* signal subsequently returns to a negative value, control circuit 48 delivers an output signal on the lower output lead thereof, forcing actuator arm 20 to return to its "OFF" position and release pinch roller 18 from capstan 16, thereby removing the force driving tape 10 forward.

In the operation of the circuit of FIG. 2, when a "forward" command signal sets the R*b* flip-flop, tape 10 may start its forward motion, depending on the status of the S flip-flop. Upon receipt of the positive R*b* output signal from the set R*b* flip-flop, AND-gate 45 delivers a positive N*ro* signal, providing that the S flip-flop is in its reset state. The positive N*ro* signal delivered by AND-gate 45 then results in tape 10 being driven forward, as for a read or write operation. The N*s* output signal of the S flip-flop is applied through an inverter 50 to an input terminal of OR-gate 46. Inverter 50 inverts the polarity and binary sense of an input signal applied thereto. Thus, if a positive signal, representing a binary 1, is applied to inverter 50, the output signal therefrom will be a negative signal, representing a binary 0. Conversely, if a negative signal, representing a binary 0, is applied to inverter 50 the output signal will be a positive signal, representing a binary 1. Therefore, if the S flip-flop is in its reset state the N*s* output signal will represent a binary 0 and inverter 50 will deliver a positive output signal to OR-gate 46. The consequent positive output signal from OR-gate 46 is applied to and enables AND-gate 45. Therefore, with the S flip-flop reset, the setting of the R*b* flip-flop causes the immediate forward motion of tape 10, because the positive R*b* signal causes a positive N*ro* signal to be delivered by the enabled AND-gate 45.

If, however, the S flip-flop is in its set state, indicating that a rewind operation is occurring, the positive N*s* signal forces inverter 50 to deliver a negative output signal. Since OR-gate 46 now receives no positive input signal, its output signal to AND-gate 45 is negative, disabling AND-gate 45. Hence, the existence of a set S flip-flop at the time the R*b* flip-flop is set prevents the R*b* flip-flop from driving tape 10 forward. In such instance the R*b* flip-flop remains set, storing a signal representing a tape forward command, until the S flip-flop is reset at the conclusion of the rewind operation, whereupon the R*b* signal becomes effective to initiate a tape forward operation.

A forward holding circuit is provided to ensure that the tape forward operation, once initiated, will continue to completion even though a "rewind" command signal is received by the S flip-flop during the duration of the operation. The forward holding circuit also prevents the initiation of a tape rewind operation during the duration of a tape forward operation. The forward holding circuit comprises an AND-gate 52, a flip-flop 53 and OR-gate 46, connected in loop configuration. At the same time that AND-gate 45 delivers a positive output signal initiating the tape forward operation, AND-gate 52, which receives input signals from the same sources as AND-gate 45, also delivers a positive output signal, designated as the N*rp* signal. This positive signal from AND-gate 52 sets flip-flop 53, designated as the R*p* flip-flop. The output signal from the R*p* flip-flop, designated as the R*p* signal, becomes positive and, being applied to OR-gate 46, ensures that OR-gate 46 will continue to deliver a positive output signal so long as the R*p* flip-flop remains set. Once the tape forward operation has commenced, even if the S flip-flop assumes its set state, thereby removing from an input terminal of OR-gate 46 the positive output signal delivered by inverter 50, the R*p* flip-flop will continue to provide the required positive input signal to OR-gate 46 to maintain AND-gate 45 enabled and the tape forward operation continuing.

When a particular amount of data on tape 10 has been read or recorded an "end of block" signal is applied to the R input lead of the R*b* flip-flop, thereby restoring the R*b* flip-flop to its reset state. The R*b* signal thereupon becomes negative, causing the output signal of AND-gate 45 to go negative, and terminating the tape forward operation. AND-gate 52 is disabled at the time the R*b* signal goes negative. The output signal from an inverter 54, which is connected to receive the output signal of AND-gate 52 now becomes positive and resets the R*p* flip-flop, thereby terminating the holding action of the forward holding circuit.

*Tape reverse controls*.—The output lead of the W flip-flop is connected to one input terminal of a two-input AND-gate 55. The other input terminal of AND-gate 55 is coupled to receive the output signal of an OR-gate 56. The output signal of AND-gate 55 is designated as the N*bo* signal, or reverse control signal, and is positive only when both input signals to AND-gate 55 are positive. The output signal of AND-gate 55 is coupled to the input terminal of a reverse control circuit 58. The output terminals of reverse control circuit 58 are connected to control windings 59, which function to control the position of actuator arm 19, shown in FIG. 1, in a manner of operation similar to that described above in connection with forward control circuit 48. Thus, when the N*bo* signal goes positive, control circuit 58 forces actuator arm 19 to its "ON" position, which urges pinch roller 17 against capstan 15, thereby driving tape 10 in the reverse direction. When the N*bo* signal subsequently returns to a negative value, reverse control circuit 58 causes the release of pinch roller 17 and removes the force driving tape 10 in the reverse direction.

In the operation of the circuit, when a "reverse" command signal sets the W flip-flop, tape 10 may start its reverse motion, depending on the status of the S flip-flop. Upon receipt of the positive N*bd* signal from the set W flip-flop, AND-gate 55 delivers a positive N*bo* signal, providing that the S flip-flop is in its reset state. The positive N*bo* signal delivered by AND-gate 55 then results in tape 10 being driven in reverse, as for an erase operation. As in the instance of the tape forward operation, the S flip-flop and inverter 50, the latter also being connected to an input terminal of OR-gate 56, enable AND-gate 55, if the S flip-flop is in its reset state. Therefore, if the S flip-flop is reset, the setting of the W flip-flop causes the immediate forward motion of tape 10, because the positive N*bd* signal causes a positive N*bo* signal to be delivered by the enabled AND-gate 55.

If, however, the S flip-flop is in its set state, indicating that a rewind operation is occurring, the negative signal from inverter 50 causes the disabling of AND-gate 55, since OR-gate 56 now receives no positive input signal. Hence, the existence of a set S flip-flop at the time the W flip-flop is set prevents the W flip-flop from driving tape 10 in reverse. In such instance the W flip-flop remains set, storing a signal representing a tape reverse command, until the S flip-flop is reset at the conclusion of the rewind operation, whereupon the N*bd* signal becomes effective to initiate a tape reverse operation.

A reverse holding circuit is provided to ensure that the tape reverse operation, once initiated, will continue to completion even though a "rewind" command signal is received by the S flip-flop during the duration of the operation. The reverse holding circuit also prevents the initiation of the tape rewind operation during the duration of a tape reverse operation. The reverse holding circuit comprises an AND-gate 62, a flip-flop 63, and OR-gate 56, connected in loop configuration. At the time that AND-gate 55 delivers a positive output signal initiating the tape reverse operation, AND-gate 62, which receives input signals from the same sources as AND-gate 55, also delivers a positive output signal, designated as the N*wp* signal. This positive signal from AND-gate 62 sets flip-flop 63, designated as the W*p* flip-flop. The output signal from the W*p* flip-flop, designated as the W*p* signal, becomes positive and, being applied to OR-gate 56, ensures that OR-gate 56 will continue to deliver a positive signal so long as the W*p* flip-flop remains set. Once the tape reverse operation has commenced, even if the S flip-flop assumes its set state, thereby removing from an input terminal of OR-gate 56 the positive output signal delivered by inverter 50, the W*p* flip-flop will continue to provide the required positive input signal to OR-gate 56 to maintain AND-gate 55 enabled and the tape reverse operation continuing.

When an "end of block" signal is applied to the R input lead of the W flip-flop, the W flip-flop is reset. The N*bd* signal thereupon becomes negative, causing the output signal of AND-gate 55 to go negative, and terminating the tape reverse operation. AND-gate 62 is disabled at the time the N*bd* signal goes negative. The output signal from inverter 64, which is connected to receive the output signal of AND-gate 62 now becomes positive and resets the W*p* flip-flop, thereby terminating the holding action of the reverse holding circuit.

*Tape rewind controls*.—The 1-output lead of the S flip-flop is connected to one input terminal of a two-input AND-gate 65. The other input terminal of AND-gate 65 is coupled to receive the inverted output signal of an OR-gate 66. The output signal of OR-gate 66 is applied through an inverter 67 to an input terminal of AND-gate 65. The output signal of AND-gate 65 is designated as the N*so* signal, or rewind control signal, and is positive only when both input signals to AND-gate 65 are positive.

The output signal of AND-gate 65 is coupled to one terminal of the solenoid of a relay 69. The other terminal of the solenoid is coupled to an appropriate potential for energization. The armature of relay 69 is connected to ground. When relay 69 is de-energized, the armature thereof connects contact 70 to ground and when the relay is energized, the armature connects contact 71 to ground.

Contact 70 is connected to upper reel control contactor 73. Control contactor 73 is connected for providing current through one of field windings 74 or 75 of drive motor 35 and through the armature 76 of drive motor 35. As described previously, control contactor 73 responds to the position of sensing arm 23, which, in turn, senses the length of tape between reel 11 and capstan 15. Thus, when energized, control contactor 73 delivers current so as to control the speed and direction of rotation of motor 35. When the armature of relay 69 connects contact 70 to ground, control contactor 73 is energized and thereby controls the direction and speed of motor 35. When contact 70 is not connected to ground, control contactor 73 is de-energized and plays no part in the control of motor 35.

Contact 71 is connected to field winding 74 of drive motor 35 through a resistor 77. When the armature of relay 69 connects contact 71 to ground, current flows through field winding 74 and armature 76 of motor 35. The motor then rotates very rapidly in the counterclockwise direction, winding tape 10 onto reel 11. Thus, when relay 69 is energized by a positive signal from AND-gate 65, the tape rewind operation takes place.

In the operation of the circuit, when a "rewind" command signal sets the S flip-flop, tape 10 may start rewinding, depending on the status of the tape forward and tape reverse controls. Upon receipt of the positive N*s* output signal from the set S flip-flop, AND-gate 65 delivers a positive N*so* signal, providing that neither a tape forward or tape reverse operation is occurring. The positive N*so* signal delivered by AND-gate 65 then results in the tape being rewound. The N*rp* signal of the forward holding circuit and the N*wp* signal of the reverse holding circuit are applied to respective input terminals of OR-gate 66. In the event that either the N*rp* signal is positive, indicative of the occurrence of a tape forward operation, or the N*wp* signal is positive, indicative of the occurrence of a tape reverse operation, inverter 67 will deliver a negative signal to inhibit AND-gate 65 and prevent the rewind operation from being initiated. If neither a tape forward nor a tape reverse operation is occurring, the setting of the S flip-flop causes the immediate rewind operation of tape 10. If, however, at the time the S flip-flop is set, a tape forward or tape reverse operation is occurring, the S flip-flop remains set, storing a signal representing a tape rewind command, until the operation in progress terminates, whereupon the N*s* signal becomes effective to initiate the tape rewind operation.

As heretofore described, the set state of the S flip-flop inhibits the intiation of a tape forward or tape reverse operation. Hence, the application of the output signal of inverter 50 to OR-gates 46 and 56 ensures that the tape rewind operation, once initiated, will continue to completion even though a "forward" or "reverse" command signal is received during the duration of the rewind operation.

The rewind operation is terminated when sensor 38 detects the metallized strip 78 affixed to the extremity of tape 10 that is attached to reel 12. Sensor 38 then delivers an output signal denoting that the beginning of the tape has been reached, such signal terminating the rewind operation. A "forward" command signal may be stored in the R*b* flip-flop at this time, awaiting the completion of the rewind operation to become effective. However, at the moment sensor 38 first delivers an output signal, reel 11 and the tape wound thereon is rotating in a counterclockwise direction with a large amount of inertia. To immediately initiate a forward operation at such time, by driving pinch roller 18 against capstan 16, woud break the tape. Accordingly, the instant invention provides apparatus for bringing reel 11 quickly to a halt and permitting tape 10 to move forward in response to a stored forward command signal, as soon as possible, without breaking the tape.

The apparatus of the invention accomplishes the objects thereof, in response to the beginning-of-the-tape signal delivered by sensor 38, by immediately decelerating reel 11 to a stop, by terminating the effect of the output signal of the S flip-flop in controlling the rewind operation, and by delaying the resetting of the S flip-flop until the tape is safely halted so that the N*s* output signal continues to inhibit the effectiveness of a stored "forward" command signal.

Sensor 38 comprises a pair of conducting cylinders 80 and 81 separated by an insulating spacer. Cylinder 80 is connected to a positive 8 volt source through a resistor 83. Cylinder 81 is connected to ground. When the tape portion without metallized strip is moving past sensor 38, cylinder 80 is insulated from cylinder 81 and no current flows through resistor 83. However, when metallized strip 78 passes over sensor 38 as the beginning of the tape is reached, a conductive path is established between cylinders 80 and 81. Current now flows from the +8 v. source through resistor 83, cylinder 80, metallized strip 78 and cylinder 81 to ground. This current constitutes the beginning-of-the-tape signal and develops a negative voltage across resistor 83.

The beginning-of-the-tape signal is amplified by an amplifier circuit including a transistor 84. Transistor 84 comprises a collector 85, a base 86 and an emitter 87. A positive six volt source is connected to emitter 87. In the absence of a voltage across resistor 83, the base-to-emitter junction of transistor 84 is reverse biased by a potential difference of 2 volts and no current flows in the transistor. When sensor 38 is shorted by metallized strip 78, cylinder 80 of the sensor is placed at ground potential and forward bias is established across the base-to-emitter junction of transistor 84, so that a large current flows in collector 85. The output signal delivered by collector 85 is denoted as the BT signal.

The cathode of a diode 89 and one terminal of a resistor 90 are connected together and to collector 85. The anode of diode 89 is connected to a negative 7.5 volt source. The other terminal of resistor 90 is connected to a negative 70 volt source. In the absence of an input signal to the base of transistor 84, current flows from the −7.5 v. source through diode 89 and resistor 90 to the −70 v. source. Since diode 89, when conducting, has only a small voltage drop thereacross, the BT signal at this time is apprroximately at the −7.5 v. level, representing a binary 0. When transistor 84 is caused to conduct, diode 89 becomes reverse biased and collector 85 and the BT signal rise to the +6 v. level, which represents a binary 1.

The BT signal is coupled to one input terminal of OR-gate 66. When metallized strip 78 at the beginning of tape 10 is sensed the BT signal becomes positive and forces OR-gate 66 to deliver a positive output signal. Inverter 67, in turn, delivers a negative output signal disabling AND-gate 65, and, therefore, terminating the effect of the N*s* output signal of the S flip-flop in controlling a rewind operation. When AND-gate 65 is so disabled the N*so* output signal thereof becomes negative and relay 69 is de-energized. The armature of the relay 69 is released from contact 71 and connects contact 70 to ground. A constant current is no longer applied to drive motor 35 and the motor is immediately controlled by control contactor 73, which, in turn, responds to sensing arm 23. Since neither capstan 15 nor 16 is driving tape 10 at this time, and there is no longer any constant current supplied to motor 35, sensing arm 23 will immediately respond to the short length of tape between reel 11 and capstan 15 to deliver control currents to motor 35 to decelerate reel 11 to a rapid halt. Thus, at the instant the beginning of tape 10 is detected, the apparatus of the present invention provides a signal to terminate the effect of the rewind command signal in controlling the rewind operation and to rapidly brake the rewind reel to a rapid halt.

To prevent a stored forward command signal in the R*b* flip-flop from immediately actuating pinch roller 18 and forcing the tape into a tape forward operation when the rewind control is terminated, the apparatus of the instant invention provides for the stored rewind command signal temporarily to continue to inhibit the stored forward command signal from initiating a tape forward operation. Thus, apparatus is provided for applying the BT signal to a delay circuit 92, which delays the resetting of the S flip-flop until such time as tape 10 has been brought to a halt.

Delay circuit 92 comprises a capacitor 93, a resistor 94 and a diode 95. One terminal of capacitor 93, one terminal of resistor 94 and the anode of diode 95 are connected together at a common junction 96. The cathode of diode 95 is connected to the common circuit point which is connected to collector 85. Therefore, the BT signal delivered by collector 85 constitutes an input signal to delay circuit 92. A negative 7.5 volt source is connected to the other terminal of capacitor 93 and a positive 70 volt source is connected to the other terminal of resistor 94.

When the BT signal is at its −7.5 v. level, current flows from the +70 v. source through resistor 94 and diode 95, establishing junction 96 at −7.5 v. Since both terminals of capacitor 93 are at −7.5 v., there is no charge or voltage difference thereacross. The voltage at junction 96 is designated as the N*bdt* signal. The N*bdt* signal is coupled to the R input lead of the S flip-flop and is ineffective to control the flip-flop so long as it remains at −7.5 v.

When the BT signal rises to +6 v. at the time the beginning of tape 10 is sensed by sensor 38, the voltage of junction 96 cannot immediately change because of the impossibility of capacitor 93 to change its voltage instantaneously. Thus, with junction 96 at −7.5 v., the voltage on the anode of diode 95, and with the +6 v. BT signal on the cathode of diode 95, the diode becomes reverse biased and ceases to conduct. Capacitor 93 then commences to charge due to current which now flows from the +70 v. source through resistor 94 and capacitor 93 to the −7.5 v. source. The voltage at junction 96 thereupon becomes more positive gradually, or exponentially, in accordance with well-known principles of electrical circuit operation. The rate of the voltage increase of junction 96 depends on the size of capacitor 93 and resistor 94, the larger the capacitor and the resistor the slower the rate of rise.

When the voltage of junction 96 reaches a predetermined positive value, the S flip-flop will be reset. Thus, the N*bdt* signal, which resets the S flip-flop is delayed a predetermined amount after the issuance of the BT signal in order to permit reel 11 to be decelerated to a halt. Upon the resetting of the S flip-flop, the output signal of inverter 50 becomes positive, thereby enabling AND-gate 45 and freeing a stored forward command signal in the R*b* flip-flop to initiate a tape forward operation.

There has therefore been described herein apparatus wherein successive commands requiring a tape to move in opposite directions may be stored, and wherein a tape handler is controlled to initiate a forward action as soon as possible after completion of a rewind operation without breaking the tape.

While the principles of this invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a system for controlling the motion of an elongated data storage member, such system including first driving means responsive to a first control signal for moving said member in a predetermined first direction along the length thereof and second driving means responsive to a second control signal for moving said medium in a predetermined second direction along the length thereof, the combination comprising:
- first signal means, when enabled, for transmitting said first control signal to said first driving means;
- second signal means, when enabled, for transmitting said second control signal to said second driving means;
- means operable, when said second signal means is enabled for disabling said first signal means;
- a signal source, when enabled, for delivering a third signal;
- means responsive to said third signal for controlling said second driving means to decelerate said member;
- means responsive to said third signal for delivering a fourth signal at a predetermined time after initiation of said third signal; and
- means responsive to said fourth signal for disabling said second signal means.

2. In a system for controlling the motion of an elongated data storage member, such system including first driving means responsive to a first control signal for moving said member in a predetermined first direction along the length thereof and second driving means responsive to a second control signal for moving said medium in a predetermined second direction along the length thereof, the combination comprising:
- first signal means, when enabled, for transmitting said first control signal to said first driving means;
- second signal means, when enabled, for transmitting said second control signal to said second driving means;
- means operable, when said second signal means is enabled for disabling said first signal means;
- means responsive to said member reaching a predetermined position for delivering a third signal;
- means responsive to said third signal for controlling said second driving means to decelerate said member;
- means responsive to said third signal for delivering a fourth signal at a predetermined time after initiation of said third signal; and
- means responsive to said fourth signal for disabling said second signal means.

3. In a system for controlling the motion of an elongated data storage member, such system including first driving means responsive to a first control signal for moving said member in a predetermined first direction along the length thereof and second driving means responsive to a second control signal for moving said medium in a predetermined second direction along the length thereof, the combination comprising:
- first signal means, when enabled, for transmitting said first control signal to said first driving means;
- a signal source, when enabled, for delivering a third signal;
- second signal means, when enabled, responsive to said third signal for transmitting said second control signal to said second driving means;
- means responsive to said third signal for disabling said first signal means;
- means responsive to said member reaching a predetermined position for delivering a fourth signal;
- means responsive to said fourth signal for controlling said second driving means to decelerate said member;
- means responsive to said fourth signal for disabling said second signal means;
- means responsive to said fourth signal for delivering a fifth signal at a predetermined time after initiation of said fourth signal; and
- means responsive to said fifth signal for disabling said signal source.

4. In a system for controlling the motion of an elongated data storage member, such system including forward driving means responsive to a forward control signal for moving said member in a predetermined forward direction and rewind driving means responsive to a rewind control signal for rewinding said member in a predetermined reverse direction, the combination comprising:
- a first signal source, when enabled, for delivering a first signal;
- first means, when enabled, responsive to said first signal for delivering said rewind control signal;
- a second signal source, when enabled, for delivering a second signal;
- second means, when enabled, responsive to said second signal for delivering said forward control signal;
- third means, responsive to said first signal, for disabling said second means;
- a third signal source, when enabled, for delivering a third signal;

fourth means responsive to said third signal for disabling said first means;
fifth means responsive to said third signal for controlling said rewind driving means to halt said member;
sixth means responsive to said third signal for delivering a fourth signal at a predetermined time after initiation of said third signal; and
means responsive to said fourth signal for disabling said first signal source.

5. In a system for controlling the motion of a magnetic tape, such system including forward driving means responsive to a forward control signal for moving said tape in a predetermined forward direction and rewind driving means responsive to a rewind control signal for rewinding said tape in a predetermined reverse direction, the combination comprising:
a first bistable device, when set, for delivering a first signal;
first gating means, when enabled, responsive to said first signal for delivering said rewind control signal;
a second bistable device, when set, for delivering a second signal;
second gating means, when enabled, responsive to said second signal for delivering said forward control signal;
third means, responsive to said first signal, for disabling said second gating means;
a third signal source, when enabled, for delivering a third signal;
fourth means responsive to said third signal for disabling said first gating means;
fifth means responsive to said third signal for controlling said rewind driving means to halt said tape;
sixth means responsive to said third signal for delivering a fourth signal at a predetermined time after initiation of said third signal; and
means responsive to said fourth signal for resetting said first bistable device.

6. In a system for controlling the motion of an elongated data storage member, such system including forward driving means responsive to a forward control signal for moving said member in a predetermined forward direction and rewind driving means responsive to a rewind control signal for rewinding said member in a predetermined reverse direction, the combination comprising:
a first signal source, when enabled, for delivering a first signal;
first means, when enabled, responsive to said first signal for delivering said rewind control signal;
a second signal source, when enabled, for delivering a second signal;
second means, when enabled, responsive to said second signal for delivering said forward control signal;
third means, responsive to said first signal, for disabling said second means;
a third signal source responsive to said member being substantially rewound for delivering a third signal;
fourth means responsive to said third signal for disabling said first means;
fifth means responsive to said third signal for controlling said rewind driving means to halt said member;
sixth means responsive to said third signal for delivering a fourth signal at a predetermined time after initiation of said third signal; and
means responsive to said fourth signal for disabling said first signal source.

7. A system for controlling the motion of a length of magnetic tape comprising:
forward driving means responsive to a forward control signal for moving said tape in a predetermined forward direction;
rewind driving means responsive to a rewind control signal for rewinding said tape in a predetermined reverse direction;
a first bistable device, when set, for delivering a first signal;
first gating means, when enabled, responsive to said first signal for delivering said rewind control signal;
a second bistable device, when set, for delivering a second signal;
second gating means, when enabled, responsive to said second signal for delivering said forward control signal;
third means, responsive to said first signal, for disabling said second gating means;
a third signal source, when enabled, for delivering a third signal;
fourth means responsive to said third signal for disabling said first gating means;
fifth means responsive to said third signal for controlling said rewind driving means to halt said tape;
sixth means responsive to said third signal for delivering a fourth signal at a predetermined time after initiation of said third signal; and
means responsive to said fourth signal for resetting said first bistable device.

8. A system for controlling the motion of a length of magnetic tape comprising:
forward driving means responsive to a forward control signal for moving said tape in a predetermined forward direction;
rewind driving means responsive to a rewind signal for rewinding said tape in a predetermined reverse direction;
a first bistable device, when set, for delivering a first signal;
first gating means, when enabled, responsive to said first signal for delivering said rewind control signal;
a second bistable device, when set, for delivering a second signal;
second gating means, when enabled, responsive to said second signal for delivering said forward control signal;
third means, responsive to said first signal, for disabling said second gating means;
a third signal source responsive to said tape being substantially rewound for delivering a third signal;
fourth means responsive to said third signal for disabling said first gating means;
fifth means responsive to said third signal for controlling said rewind driving means to halt said tape;
sixth means responsive to said third signal for delivering a fourth signal at a predetermined time after initiation of said third signal; and
means responsive to said fourth signal for resetting said first bistable device.

9. A system for performing various operations on a length of magnetic tape in response to various commands occurring at random times and for storing signals representing said commands, comprising:
forward driving means responsive to a forward control signal for moving said tape in a predetermined forward direction;
rewind driving means responsive to a rewind control signal for rewinding said tape in a predetermined reverse direction;
a first bistable device, when set, for delivering a first signal;
first gating means, when enabled, responsive to said first signal for delivering said rewind control signal;
means for supplying a rewind command signal to set said first bistable device;
a second bistable device, when set, for delivering a second signal;
second gating means, when enabled, responsive to said second signal for delivering said forward control signal;

third means, responsive to said first signal, for disabling said second gating means;

means for supplying a forward command signal to set said second bistable device;

means following the movement of said tape in said forward direction by a predetermined amount for resetting said second bistable device;

a third signal source responsive to said tape being substantially rewound for delivering a third signal;

fourth means responsive to said third signal for disabling said first gating means;

fifth means responsive to said third signal for controlling said rewind driving means to halt said tape;

sixth means responsive to said third signal for delivering a fourth signal at a predetermined time after initiation of said third signal; and means responsive to said fourth signal for resetting said first bistable device.

No references cited.

MERVIN STEIN, *Primary Examiner.*

UNITED STATES PATENT OFFICE
CERTIFICATE OF CORRECTION

Patent No. 3,206,133 September 14, 1965

Robert L. Forster et al.

It is hereby certified that error appears in the above numbered patent requiring correction and that the said Letters Patent should read as corrected below.

In the grant, lines 1 and 2, for "Robert L. Forster, of Santa Clara, California, and William D. Mixon, of Phoenix, Arizona," read -- Robert L. Forster, of Santa Clara, California, and William D. Mixon, of Phoenix, Arizona, assignors to General Electric Company, a corporation of New York, --; line 11, for "Robert L. Forster and William D. Mixon, their heirs" read -- General Electric Company, its successors --; in the heading to the printed specification, lines 3 to 5, for "Robert L. Forster, 268 Kellogg Way, Santa Clara, Calif., and William D. Mixon, 8420 N. 16th Ave., Phoenix, Ariz." read -- Robert L. Forster, Santa Clara, Calif., and William D. Mixon, Phoenix, Ariz., assignors to General Electric Company, a corporation of New York --.

Signed and sealed this 12th day of April 1966.

(SEAL)
Attest:

ERNEST W. SWIDER
Attesting Officer

EDWARD J. BRENNER
Commissioner of Patents